Feb. 2, 1954            L. G. HOLT            2,668,019

STRAND TENSION CONTROL MECHANISM

Filed July 7, 1949

INVENTOR
L.G. HOLT
BY W.C. Parnell
ATTORNEY

Patented Feb. 2, 1954

2,668,019

UNITED STATES PATENT OFFICE 2,668,019

STRAND TENSION CONTROL MECHANISM

Leo G. Holt, Merrimac, Mass., assignor to Western Electric Company, Incorporated, New York, N. Y., a corporation of New York Application July 7, 1949, Serial No. 103,483

4 Claims. (Cl. 242—45)

1

This invention relates to tensioning devices and more particularly to tensioning devices used on machines for winding electrical coils.

In the winding of electrical coils the wire to be formed into coils is usually taken from prewound spools of wire, with the wire being unwound from the spools by the rotation of the core on which the coil is to be wound. It is necessary that the wire be kept at a fairly uniform tension during this operation as wide variations in tension would cause whipping of the wire and consequent breakage.

In the method conventionally used for maintaining a desired wire tension, the wire to be wound is passed during its travel over a pulley located at the end of an arm, with the arm actuating a brake associated with the spool which is being unwound. If there should be too much slack in the wire, the arm is moved by a spring in a direction which causes a braking action to be applied to the spool. This braking action resists the unwinding of the spool and increases the tension in the wire being unwound. Should the wire tension become greater than desired, the tension moves the control arm against the action of the spring to a position which reduces the braking action on the spool being unwound, thus lowering the tension in the wire. The tension is maintained generally at a desired value by adjusting the spring pressure against which the wire tension operates.

It will be obvious that tension control by this conventional method is an intermittent process, with the control arm making constant changes in its position to take care of instantaneous variations in wire tension. This intermittent tensioning is a natural result of the use of mechanical tensioning devices, and is undesirable as it results in considerable breakage of wire when fine gages are used, and in coils often having poor form factor.

It is therefore an object of this invention to enable wire tension during coil winding operations to be maintained continuously at a desired value, with constant tensioning being provided relatively independently of winding speed.

Applicant accomplishes his object by feeding each wire to be wound from a supply spool through tensioning rollers and around a grooved pulley mounted on the shaft of a direct current generator. The armature of the generator is short circuited or closed through a suitable low impedance, with the result that the torque required to drive it with the generator field excited is substantially independent of winding speed over the normal working range. By adjusting the voltage of a supply common to all of the generator fields, a uniform tension may be set in all wires simultaneously, with the tension remaining constant throughout the winding operation.

Other objects and advantages will be apparent from the following detailed description taken in conjunction with the attached drawing in which.

Figure 1:
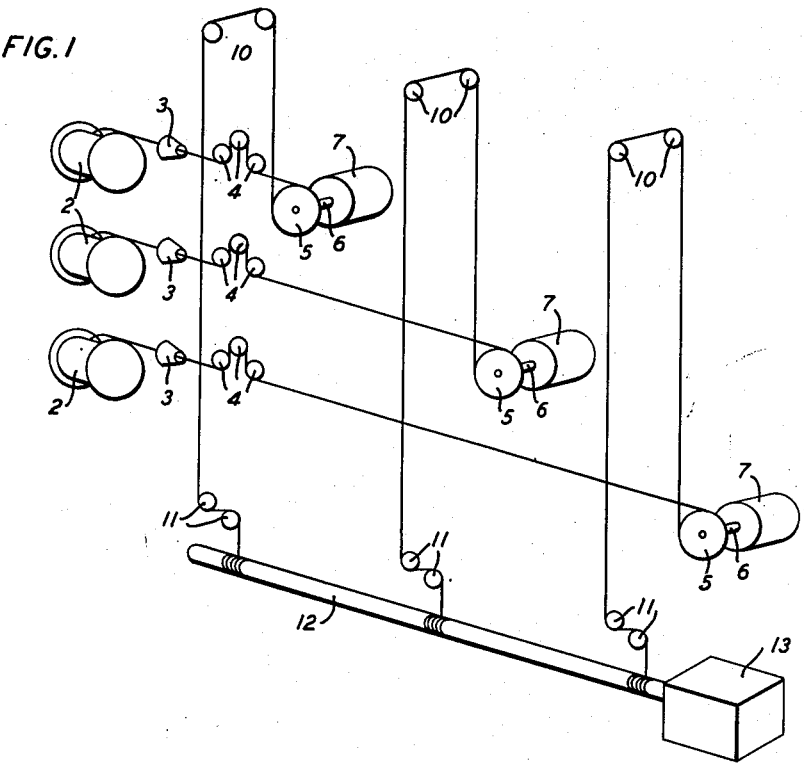
Fig. 1 is a schematic diagram of the coil winding apparatus.

With reference to Fig. 1, a plurality of electrical wires 1 which are to be simultaneously formed into electrical coils are taken from prewound wire spools 2. The spools are mounted on any suitable plate of bracket (not shown) which is convenient to the coil winding machinery and which allows the wire to be easily unwound from the spools. In the particular embodiment here described, each wire 1 is removed from its spool 2 by being pulled over one side thereof, with the spool remaining stationary during the unwinding operation. In unwinding wire in this manner, a smooth polished disc is often mounted over the flange of the spool over which the wire is whipped off so that the wire will not be damaged by any rough spots which may be present at that end of the spool. On leaving the spool the wire is drawn through a nose guide 3, which serves to position the wire for entrance over tensioning rollers 4. The nose guide 3 is conically formed in order to conform as closely as possible to the path taken by the wire as it whips off the spool 2. The rollers 4 which rotate freely on their mountings cause the wire to assume the form of a horseshoe as it passes around them, and are used to apply a slight tension to the wire so that the wire will be taut during its passage over the grooved pulley 5. The pulley 5 is rigidly mounted on a shaft 6 of a direct current generator 7, and the groove of the pulley is lined with a surface of rubber or other resilient frictional material which grips the wire by friction as it passes over the pulley and permits tension control to be applied to the wire by the generator 7.

On leaving the pulley 5 the wire passes over take-up rollers 10, which are used solely to keep the wire tight when the machine is not operating and the wire is being attached to the coil stick 12 around which it is to be wound. The wire next passes over positioning rollers 11 and then around the coil stick. The coil stick, which is used to enable a plurality of coils to be wound at the same time, is mounted on a mandrel or arbor, the latter being provided with suitable driving means 13. As the mandrel is rotated by its driving means, it turns the coil stick and this causes the plurality of wires to be wound, which have been initially secured to the coil stick at their desired locations, to be pulled from their respective spools and wound onto the coil stick. When the coils have been wound to their proper size, the coil winding operation is stopped, and the coil stick is then cut on each side of each coil to provide a group of independent coils wound on the coil stick as a core.

To summarize the setting up of the winding apparatus, wire from each spool 2 is fed through nose guide 3, threaded around rollers 4, then threaded around the pulley 5 up around take-up pulleys 10, down through positioning rollers 11, and then wound on the coil stick 12. Since this procedure will naturally result in some slack between the spool 2 and the pulley 5, this slack is pulled back to the spool and is then wound back on the spool by hand rotation.

Figure 2:
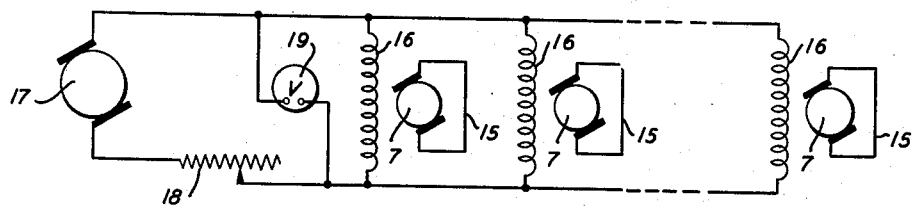
Fig. 2 is a schematic wiring diagram of the tension control system.

The present invention lies in the manner of applying a uniform tension to the plurality of wires as they are being wound on the coil stick 12, this tension control scheme being shown schematically in Fig. 2. With reference to the drawing, it will be seen that each direct current generator 7 has its armature short circuited as at 15, or otherwise provided with a low impedance circuit. Each generator 7 has a separately excited field 16 which are all connected in parallel with each other and are supplied with direct current potential by a generator 17 or any other suitable direct current source. A rheostat 18 is connected in the supply circuit of the generator fields, and is used to vary the voltage which is applied to these fields. Differences in characteristics of the individual generators may be compensated for by the use of trimming rheostats in the generator field circuits or by using suitable variable impedances in the armature circuits, or by a combination of the two methods.

Since the rubber lined pulley 5 around which the wire 1 passes is directly connected to the armature of the direct current generator 7, and since the wire is kept taut by the rollers 4 as it passes over the pulley 5, it is obvious that the resistance which the pulley 5 offers to the wire which passes over it and rotates it and the armature, and correspondingly the tension which is applied to the wire by its passage over the pulley will vary directly with the power dissipated in the armature circuit. Also, since the electric power developed by each generator is proportional to the strength of its field, the mechanical power required to drive the generator is easily varied by varying the voltage applied to the field. It is thus possible to adjust tension in all of the wires being wound instantaneously to any desired value merely by using the rheostat 18 to vary the field currents and thereby the resistance of the pulley 5 to the passage of the wire.

It has been found that once the armature has been rotated beyond a very low maximum speed, the tension which is applied to the wire is substantially constant regardless of speed, and depends only upon the strength of the current flowing through the generator field. This is particularly true of speeds ranging from 300 R. P. M. to 600 R. P. M., which is the normal winding speed range and field voltages corresponding to tensions normally desired in medium and fine wire sizes.

Although the tensioning means has been described in connection with direct current generators, applicant has found that conventional direct current motors function satisfactorily as generators for this purpose. The separately excited fields 16 for the direct current generators are shown as being connected in parallel, but this is not essential to the invention as these fields may also be connected in series, or in series parallel provided that the voltage applied to each field is the same.

A voltmeter 19 may be connected into the supply circuit for the generator fields and may by experiment be calibrated in terms of wire gage size by determining the particular field voltage which provides the tension desired for a particular size of wire.

The present invention overcomes the disadvantage of slow response to tension changes which is inherent in the conventional mechanical tension control by maintaining a desired preset tension which is substantially independent of winding speed once the speed rises beyond a very small minimum. Also, the proposed method permits calibration of the tensioning control so that the desired tension can be set with a quick adjustment rather than by the tedious spring gage adjustment formerly required. In addition, the new tensioning system enables tension adjustments for all wires being wound to be made simultaneously rather than as independent units. Finally, the tension control system herein proposed enables large numbers of spools to be unwound with a minimum of wire breakage and with close control to insure that coils are formed of a uniform size.

Although the invention has been described with particular reference to the winding of electrical coils, it is not limited to this particular application, but may be used wherever proper tensioning is essential, as for example in the textile industry where each strand used in weaving cloth must be maintained carefully at a constant tension.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In apparatus for controlling the tension of a moving strand to a predetermined substantially constant value over the range of operating speeds for the strand, the combination with an electric generator driven by the strand and having a closed armature circuit, of means for applying field potential to the generator and means for presetting the field strength at a fixed predetermined value to produce a desired tension in the strand.

2. In apparatus for adjusting tension in strands to a predetermined substantially constant value over the range of operating speeds for the strand, the combination with a strand, means for imparting movement to the strand, and means for creating an initial tension in the strand, of a direct current generator having a low impedance armature circuit, a shaft for the armature, a pulley over which the strand passes in its travel, said pulley being rigidly mounted on the armature shaft, a separately excited field for the generator, and means for establishing a specific armature load by presetting the field strength of the generator, thereby causing the pulley to exert a frictional force against the strand which is substantially independent of strand speed.

3. In apparatus for adjusting tension in a plurality of strands simultaneously, the combination with the strands, means for imparting movement to the strands, and means for creating an initial tension in the strands, of a direct current generator for each strand to be adjusted, each generator having its armature short circuited, a shaft for each armature, a pulley for each strand over which the strand passes in its travel, said pulleys being rigidly mounted on the corresponding armature shafts, separately excited fields for the generators, and a rheostat connected in the voltage supply circuit for the generator fields which simultaneously establishes specific armature loads of the generators by uniformly presetting the strength of the generator fields, thereby causing the pulleys to exert a uniform frictional force against the strands passing over them which is substantially independent of the speed of the strands.

4. In apparatus for adjusting tension in a plurality of strands simultaneously, the combination with the strands, means for imparting movement to the strands, and means for creating an initial tension in the strands, of a direct current generator for each strand to be adjusted, each generator having its armature short circuited, a shaft for each armature, a pulley for each strand over which the strand passes in its travel, said pulleys being rigidly mounted on the corresponding armature shafts and having their grooves lined with a resilient frictional material, separately excited fields for the generators, a rheostat connected in the voltage supply circuit for the generator fields which simultaneously establishes specific armature loads on the generators by uniformly presetting the strength of the generator fields, thereby causing the pulleys to exert a frictional force against the strands passing over them which is substantially independent of the winding speed, and indicating means calibrated in terms of tension connected across the field supply circuit of the generators.

LEO G. HOLT.

References Cited in the file of this patent

UNITED STATES PATENTS

| Number | Name | Date |
|---|---|---|
| 501,961 | Richardson | July 25, 1893 |
| 1,343,910 | Evans | June 22, 1920 |
| 1,374,335 | Sundh | Apr. 12, 1921 |
| 1,838,967 | Staege | Dec. 29, 1931 |
| 1,894,562 | Jansen | Jan. 17, 1933 |
| 1,925,866 | Drake | Sept. 5, 1933 |
| 1,959,680 | Livingston | May 22, 1934 |
| 2,011,371 | Mohler | Aug. 13, 1935 |
| 2,343,461 | Knaus | Mar. 7, 1944 |
| 2,353,639 | Berthold | July 18, 1944 |
| 2,459,064 | Davis | Jan. 11, 1949 |
| 2,468,557 | Huston | Apr. 26, 1949 |
| 2,583,148 | Kimball et al. | Jan. 22, 1952 |